United States Patent
Kiermeier et al.

(10) Patent No.: US 6,794,626 B2
(45) Date of Patent: Sep. 21, 2004

(54) METHOD AND SYSTEM FOR VERIFYING CORRECT MOUNTING OF A PRINTING PLATE ON AN EXTERNAL DRUM IMAGING MACHINE

(75) Inventors: Arnfried Kiermeier, Munich (DE); Richard Shih, Andover, MA (US)

(73) Assignee: Agfa Corporation, Wilmington, MA (US)

( * ) Notice: Subject to any disclaimer, the term of this patent is extended or adjusted under 35 U.S.C. 154(b) by 368 days.

(21) Appl. No.: 10/047,636

(22) Filed: Jan. 15, 2002

(65) Prior Publication Data

US 2003/0133132 A1 Jul. 17, 2003

(51) Int. Cl.[7] .............................. G02B 27/40; G02B 7/04
(52) U.S. Cl. ................... 250/201.2; 250/201.4; 347/258; 358/496
(58) Field of Search .................... 250/201.2, 201.4, 250/201.5, 206.1, 216, 559.16, 559.29, 201.2 O; 347/224, 225, 258; 399/218; 358/474, 496, 505

(56) References Cited

U.S. PATENT DOCUMENTS

| | | | |
|---|---|---|---|
| 5,208,451 A | 5/1993 | Deck | |
| 5,251,011 A | 10/1993 | Fujiwara et al. | |
| 5,764,381 A | * 6/1998 | Landsman | 358/490 |
| 6,504,137 B1 | * 1/2003 | Reznichenko | 250/201.5 |
| 6,633,024 B2 | * 10/2003 | Rolfe | 250/201.2 |

* cited by examiner

*Primary Examiner*—Kevin Pyo
(74) *Attorney, Agent, or Firm*—Robert A. Sabourin; Joseph D. King

(57) ABSTRACT

A printing plate mounted on an external drum platesetter is verified to be securely fastened to the drum using an autofocus system prior to spinning the drum to maximum operating speed. An autofocus mode is employed to set a reference signal using a light beam and light sensor. After establishing the reference signal at one end of the plate, the system switches to a second mode of operation where the autofocus system is fixed, and the reference signal is monitored as the drum and plate are rotated. If the reference signal deviates from the initial value, the rotation of the drum is stopped and an operator is alerted.

13 Claims, 5 Drawing Sheets

METHOD AND SYSTEM FOR VERIFYING CORRECT MOUNTING OF A PRINTING PLATE ON AN EXTERNAL DRUM IMAGING MACHINE

BACKGROUND OF THE INVENTION

The invention herein generally relates to the field of imaging systems for use in the graphic arts industry. More particularly, the invention relates to detection of improperly installed printing plates on an external drum platesetter used to image printing plates.

Printing plates, often made from aluminum sheets or polymer based materials, are manufactured in various sizes. Platesetters, machines used to transfer an electronic image onto a printing plate, must be capable of accommodating different size printing plates.

One technique of mounting a printing plate is to provide a clamp (or clamps) positioned on the outside surface of an external drum platesetter in a fixed location. This fixed position clamp is used to hold one end of the plate, often referred to as the leading edge, onto the external drum. A second clamp, also positioned on the outside surface of the external drum platesetter is moveable, and may be positioned most anywhere on the outside circumference of the drum. The moveable, or "variable" clamp is preset a predetermined distance from the fixed clamp corresponding to the longitudinal length of a particular printing plate to be mounted. The variable clamp is used to hold the end of the printing plate that is opposite from the end being held by the fixed clamp. The end of the plate held by the variable clamp (or clamps) is often referred to as the trailing edge. The variable clamp may be either manually positioned, or automatically positioned via a motor and a controller.

A common failure mode of a platesetter is displacement of one end of the printing plate from under one of the clamps during spin up of the drum. This can occur because of a failure of one of the clamps, or because the variable clamp was set an incorrect distance from the fixed clamp for the size plate being used. A spinning drum having a printing plate clamped at only one end is considered a dangerous condition. In addition to destroying the plate and possibly the platesetter itself, the loose end of the plate can injure an operator or even fly off the drum.

Adding components to the existing system to detect a loose plate increases product cost, decreases reliability, and adds complexity to the system, and hence is undesirable.

SUMMARY OF THE INVENTION

The invention herein solves at least the problem of spinning up a drum to full speed, having a plate, or other substrate either partially or completely unsecured onto the drum. The invention herein prevents injury to an operator caused by:

1) a loose printing plate when an operator attempts to stop the drum or otherwise intervene, and
2) precluding a printing plate from flying off the drum.

The invention herein automatically detects a printing plate or other recordable substrate that is not securely fastened to a rotating drum machine, and subsequently stopping rotation of the drum.

The invention herein uses an existing autofocus subsystem in an imaging system to detect an unsecured printing plate mounted to an external drum imaging machine while rotating the drum at a fraction of normal operating speed. The drum is slowly rotated to position the leading edge clamp proximate the incident light beam used for autofocusing. This maneuver places one end of the printing plate such that an autofocus light beam is incident upon (or impinges on) one end of the plate. The autofocus system positions a focusing lens such that optimum focus is obtained. The focus lens is then fixed in place. The drum is slowly rotated at only a fraction of the normal operating speed keeping centrifugal forces low (compared to full speed) thereby preventing the plate from being a danger to an operator and/or the machine itself.

The drum is slowly rotated so at least a portion of the length of the plate is exposed to the autofocus light beam. Preferably, at least one half of the length of the plate is exposed to the autofocusing beam. As the drum is rotated, an autofocus signal is monitored. If the autofocus signal does not deviate from a predetermined value, the plate is determined to be securely mounted, and the drum is spun up to normal operating speed. If the autofocus error signal exceeds a predetermined value, the plate is determined to be unsecurely mounted and the rotation of the drum is immediately stopped.

BRIEF DESCRIPTION OF THE DRAWINGS

The following description may be further understood with reference to the accompanying drawings in which.

The drawings are shown for illustrative purposes only, and are not to scale.

DETAILED DESCRIPTION OF THE INVENTION

Though the following description of the invention herein is described in the context of an external drum platesetter, the application of the invention should not be limited to such. For example, the invention herein may also be employed on external drum imagesetters and/or printing presses. Printing plate 34 may alternatively be a piece of film in lieu of a printing plate without deviating from the spirit of the invention.

Figure 1:
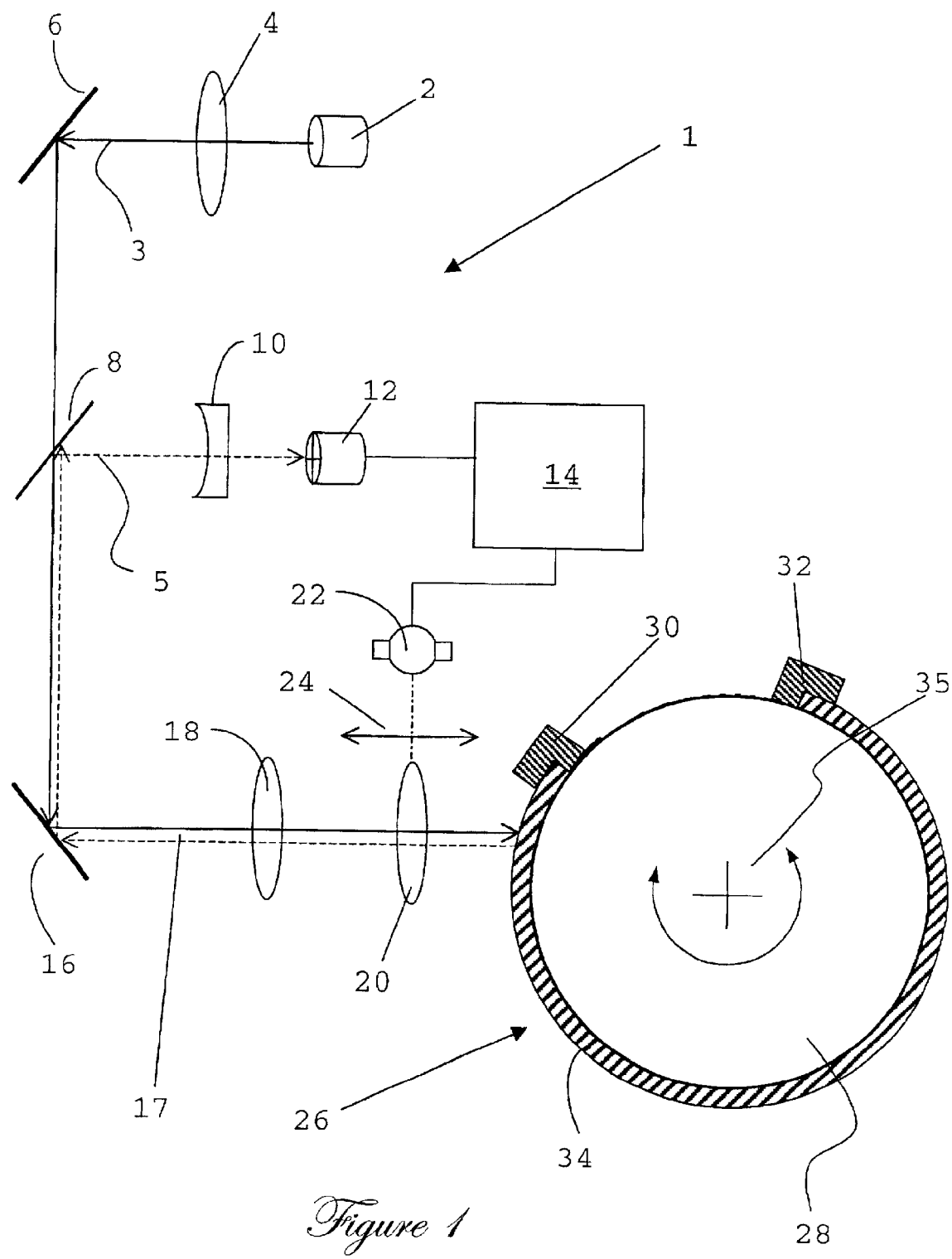
FIG. 1 shows one embodiment of an autofocus system in accordance with the invention.

Referring to FIG. 1, an autofocus system 1 is employed with an external drum imaging system generally shown at 26. A Printing plate 34 is mounted to a rotatable external drum (or cylinder) 28 using clamps 30 and 32.

Light source 2 creates a beam of light 3 that is collimated using lens 4. Light beam 3 is directed through magnifying lens 18 and focusing lens 20 using fold mirrors 6 and 16. Light source 2 is preferably a semiconductor laser, but any type of laser source may be employed. Further, other light sources may be suitable as well. Light beam 3 is a different wavelength than a laser beam (or beams) used to transfer an electronic image to plate 34. However, light beam 3 and a "writing" laser beam (not shown) may use a portion of the same optical path in the invention herein.

Light beam 3 is focused into a small spot onto printing plate 34 using focusing lens 20 and hence may be referred to as an incident light beam 3. Light beam 3 is directed onto plate 34 at a location above (or below) the spin axis 35 of drum 28. This is to create diffuse light being reflected back toward focusing lens 20, and avoid a direct reflected beam that would be present if light beam 3 were to be applied to plate 34 perpendicularly.

A portion of incident light beam 3 is reflected from printing plate 34 forming reflected light beam 5. Light beam 5 passes back through focusing lens 20, and magnifying lens 18. Reflected light beam 5 is directed to beamsplitter 8 by fold mirror 16. Beamsplitter 8 prevents reflected light beam 5 from passing to light source 2 by directing light beam 5 toward aspherical lens 10.

Aspherical lens 10, may be a cylindrical plano-concave lens that provides magnification (or in other words, image compression) in one axis only. Reflected light beam 5 illuminates a light sensor 12 after passing through aspherical lens 10.

Light sensor 12 is preferably a quadcell light sensor that is well known in the art of imaging optics, but is not limited to such. Light sensor 12 creates an electrical signal representative of a focus condition of incident light beam 3 on plate 34 and is coupled to a controller 14.

Controller 14 provides a drive signal to motor 22 that is mechanically coupled to focusing lens 20. Controller 14 adjusts the spatial position of focusing lens 20 relative to printing plate 34 using motor 22, to achieve optimum focus of incident light beam 3 upon plate 34. An algorithm stored in controller 14 analyses the output from light sensor 12 to determine the position of focusing lens 20 by moving focusing lens 20 along a direction shown by arrow 24.

Controller 14, light sensor 12, and motor 22 from a feedback loop for positioning focusing lens 20 using light reflected from plate 34. This is the autofocus mode of operation.

Figure 2B:
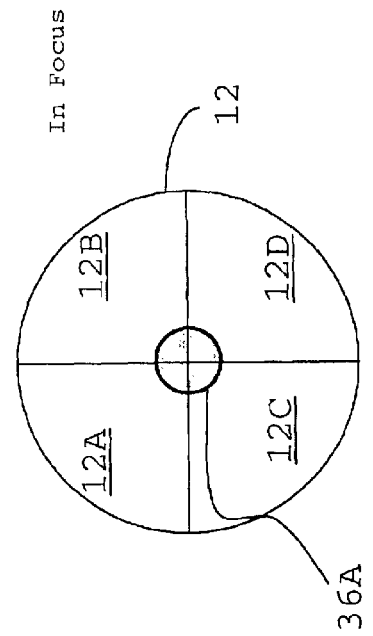
FIGS. 2a–2d show light patterns illuminating a quadcell light sensor representative of various focus conditions of a light beam incident upon a printing plate.

FIGS. 2a–2d will be used to describe the operation of light sensor 12. Light sensor 12 is composed of four quadrants 12A–12D, each quadrant exposes an active semiconductor PN junction to incident light. When light illuminates any or all of the PN junctions (not shown) an electrical current is generated in each quadrant (note the light that actually illuminates light sensor 12 is reflected light beam 5). If light illuminates only one quadrant, electrical current is generated in only that particular quadrant. This provides an ability to discriminate between different shapes of light spots that illuminate light sensor 12. FIG. 2b shows a small round light spot 36A illuminating light sensor 12. This case yields equal electrical currents generated in each quadrant and may be considered an in focus condition representing incident light beam 3 is in focus on printing plate 34.

Figure 2D:
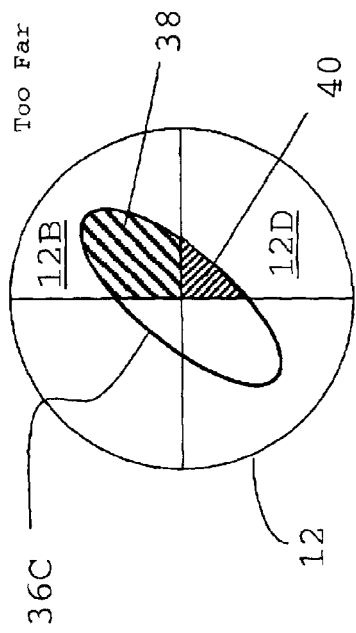
Figure 2A:
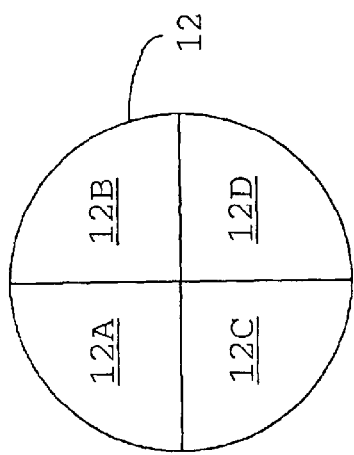
Figure 2C:
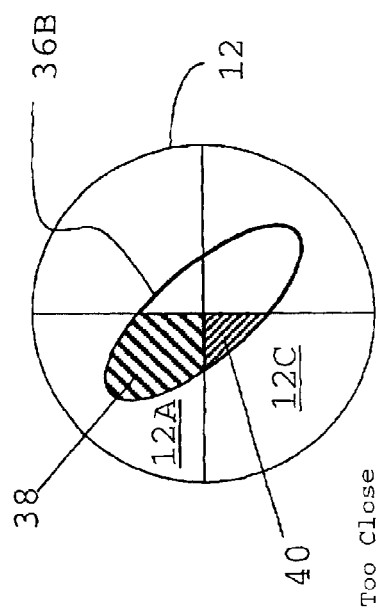

However, if light beam 3 illuminating printing plate 34, and hence reflected light beam 5, is out of focus, the size of light spot 36A is much larger. Since the out of focus reflected light beam 5 passes through aspherical lens 10, the beam is compressed in only one direction yielding a non-round light spot as shown in FIG. 2c as light spot 36B. The amount of compression, and hence how elliptical light spot 36B becomes, depends on how far out of focus reflected light beam 5 is. Depending if the out of focus condition is the result of focusing lens 20 being either too far or too close to printing plate 34, light spot 36 appears angled left or right as shown in FIGS. 2c and 2d as 36B and 36C respectively. Proper rotational alignment between aspherical lens 10 and light sensor 12 is required in order to obtain focal discrimination as is well known in the art. If light spot 36B or 36C is perfectly vertical (or perfectly horizontal) and centered on light sensor 12, equal currents would be generated in each quadrant preventing focal discrimination. Preferably, a 45 degree angle is introduced between aspherical lens 10 and light sensor 12.

Referring to FIG. 2c, quadrants 12A and 12C have unequal areas, 38 and 40, illuminated by light spot 36B. Hence, two different electrical currents are generated in the two quadrants 12A and 12C (and quadrants 12B and 12D). Many different combinations of using quadrants 12A–12D are possible to determine a focus condition and are well known in the art and will not be elaborated upon. It is recognized that a focal condition may be determined using only two of the quadrants of light sensor 12.

Figure 3:
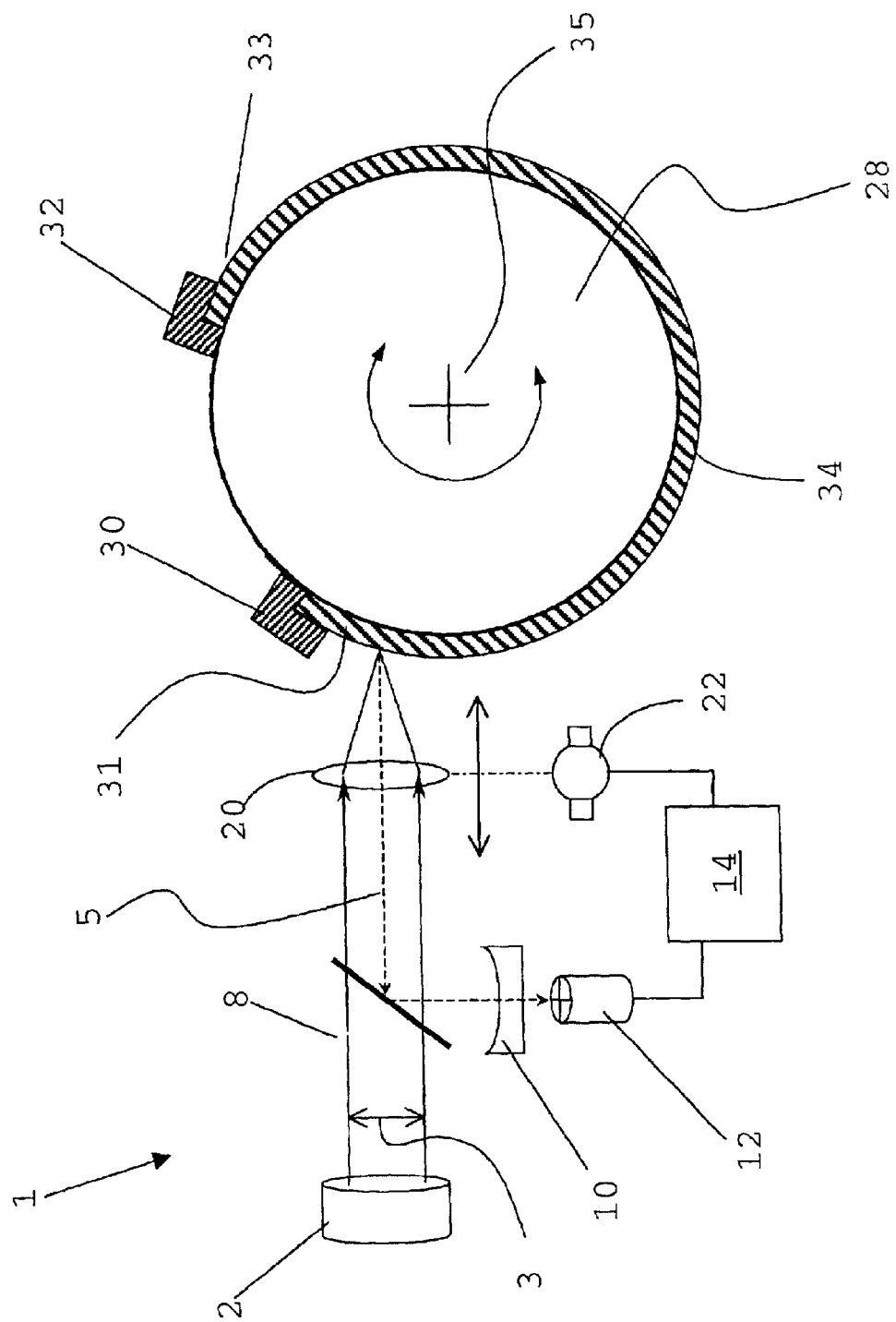
FIG. 3 shows a portion of the autofocus system of FIG. 1 with a printing plate securely mounted to an imaging machine.
Figure 4:
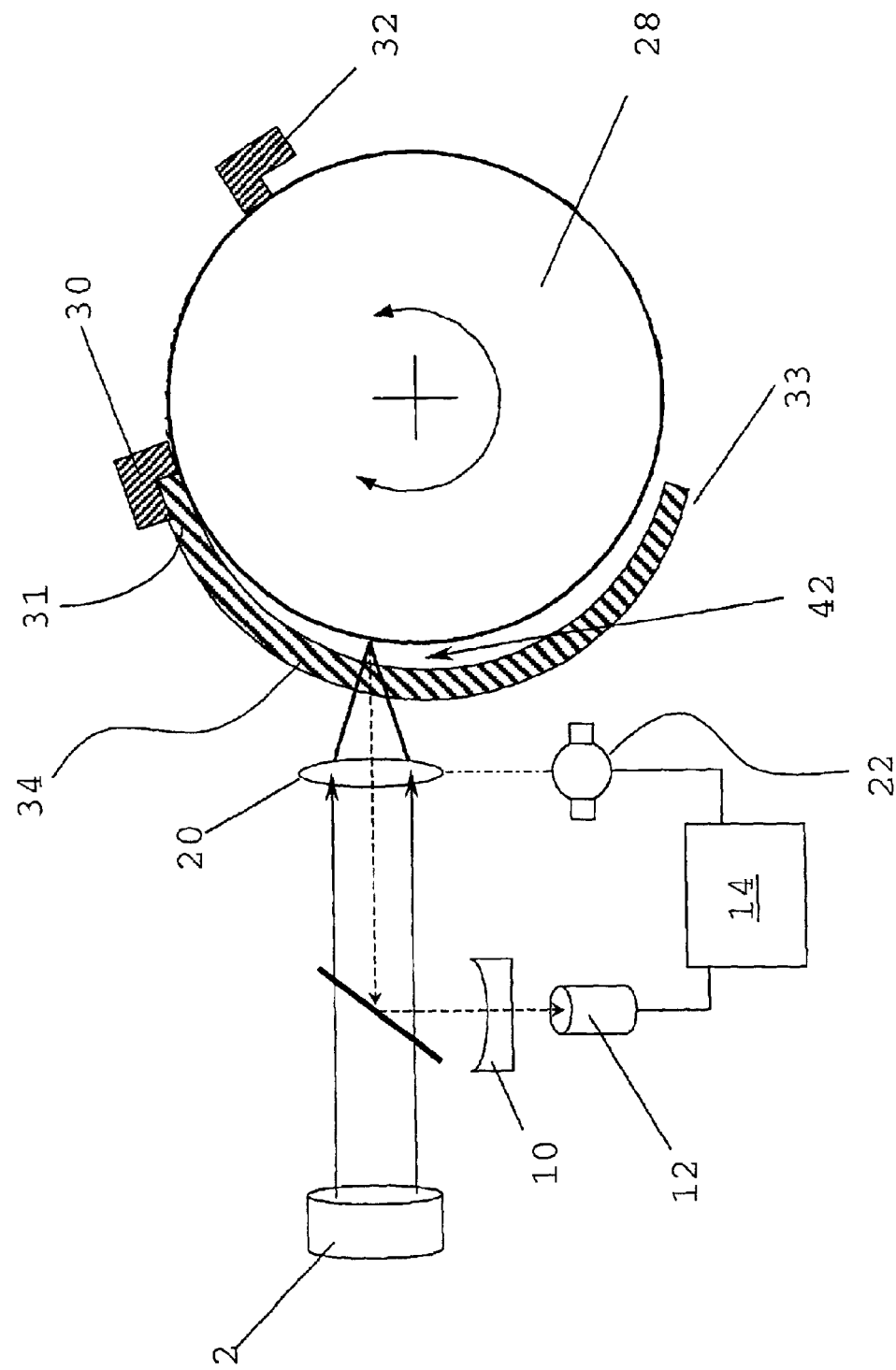
FIG. 4 shows a portion of the autofocus system of FIG. 1 with a printing plate insecurely mounted to an imaging machine.
Figure 5:
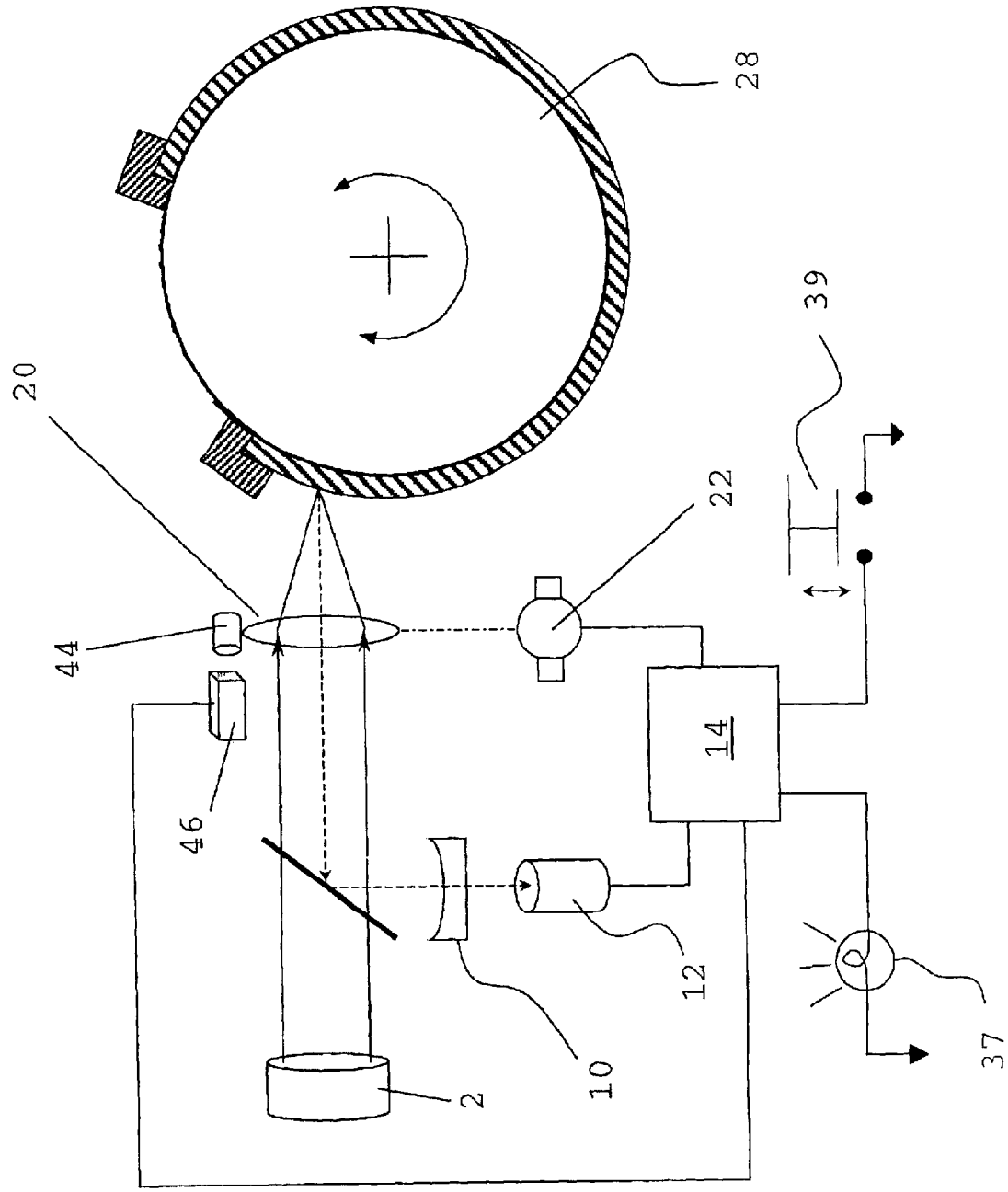
FIG. 5 shows a portion of the autofocus system of FIG. 1 with Hall mode apparatus in accordance with the invention.

Referring to FIGS. 3–5, operation of the inventive system and method herein will be described.

The end 31 of printing plate 34 is referred to as the leading edge as it is the end first fed onto drum 28 during the plate loading process. Leading edge 31 is clamped to drum (or cylinder) 28 with leading edge clamp (or clamps) 30. Trailing edge 33 of printing plate 34 is clamped to drum 28 using trailing edge clamp (or clamps) 32.

Drum 28 is rotated about spin axis 35 to position leading edge clamp 30 (and by default leading edge 31 of plate 34) such that incident light beam 3 illuminates a portion of leading edge 31 in the middle of the plate.

Autofocus system 1 then focuses incident light beam 3 onto printing plate 34 such that light spot 36A becomes small and generally round.

After achieving desired focus, via monitoring electrical signal(s) from light sensor 12 using controller 14, focusing lens 20 is fixed in place, at the spatial position that yields the desired focus of incident light beam 3 (and hence reflected light beam 5).

Drum 28 is slowly rotated in the direction that causes incident light beam 3 to travel toward trailing edge clamp 32, without causing incident light beam 3 to pass over leading edge clamp 30. The focus condition of incident light beam 3 impinging upon plate 34 is monitored using light sensor 12 and controller 14 as drum 28 is rotated at least half the length of plate 34 (or alternatively half the distance between leading edge clamp 30 and trailing edge clamp 32).

If plate 34 is not securely clamped at both ends 31 and 33 by clamps 30 and 32 respectively, a gap 42 is introduced between plate 34 and drum 28 as shown in FIG. 4. Gap 42 causes incident light beam 3 to be out of focus as plate 34 is now closer to lens 20 which has been spatially fixed. Light spot 36A becomes elliptically shaped as shown in FIG. 2c or 2d, and may even become line shaped if severely out of focus. Light sensor 12 provides an electrical signal representative of elliptically shaped light spot 36B or 36C to controller 14. Controller 14 recognizes the electrical signal(s) representative of elliptically shaped light spot 36B or 36C to be different than the electrical signal(s) representative of small generally round light spot 36A previously measured. If the difference between the electrical signals representative of light spots 36A and 36B(or 36C) exceeds a predetermined value, plate 34 is determined to be unsecured on drum 28 by controller 14. Controller 14 causes drum 28 to stop rotating and optionally provides an alarm 37, visually and/or audibly, to an operator. A reset circuit 39 may be employed operative to prevent drum 28 from rotating until an operator resets the circuit.

If plate 34 is properly secured at both ends 31 and 33 by clamps 30 and 32 respectively, incident light beam 3 remains in focus, and light spot 36 remains generally round shaped. If drum 28 is rotated a predetermined distance without light beam 3 going out of focus, controller 14 determines plate 34 to be properly secured to drum 28, and allows drum 28 to reach normal operating speed of rotation.

FIG. 5 shows one embodiment of providing a second mode of operation of autofocus system 1 for use with the invention herein.

A magnet 44, preferably a permanent magnet, is fixedly coupled to focusing lens 20. A Hall effect sensor 46, operatively coupled to controller 14, is fixedly positioned proximate to magnet 44. An electrical signal is created by Hall effect sensor 46 representative of a spatial position of magnet 44, and hence the spatial position of focusing lens 20. The manner in which Hall effect sensor 46 and magnet 44 operates is well known and will not be described herein. In Hall mode, controller 14, Hall effect sensor 46, magnet 44, and motor 22 form a second feedback loop for controlling a spatial position of focusing lens 20 independent of a focus condition of light beam 3.

Once focusing lens 20 is fixed in place during autofocus mode of operation, autofocus system 1 then switches to Hall mode of operation. In Hall mode, controller 14 determines the value of a reference signal provided by Hall effect sensor 46 that corresponds to the in focus condition determined by the autofocus mode.

Controller 14 maintains focusing lens 20 in a fixed position by monitoring Hall effect sensor 46, and adjusting the position of focusing lens 20 using motor 22, to keep the reference signal provided by Hall effect sensor constant.

Though the invention herein has been described for verifying a printing plate (or other recordable substrate) is securely mounted to a surface, other mounting anomalies may also be detected with the invention.

For example, the invention herein may be used to detect and locate debris trapped between a printing plate and a support surface. Such a piece of debris could cause a bulge to appear in the plate thereby introducing artifacts while imaging the plate. Further, if the printing plate is accidentally buckled, kinked or bent during handling or loading of the plate, the invention herein may be used to detect and locate such an anomaly. The afore mentioned examples of mounting anomalies are cases where the media is also not considered securely mounted to a support surface.

Those skilled in the art will appreciate that numerous modifications and variations may be made to the above disclosed embodiments without departing from the spirit and scope of the present invention.

We claim:

1. A method of verifying an imageable media is securely fastened to a support surface of an imaging machine, said method comprising the steps of:

providing an imageable media, wherein said media is mounted onto a support surface of a drum imaging machine;

focusing a light beam onto said imageable media using an auto focus system by varying a position of a focusing lens relative to said imageable media;

directing light reflected from said imageable media onto a light sensor, said light sensor operative for providing an electrical signal representative of a focus condition of said light beam on said imageable media;

fixing a position of said focusing lens in response to said electrical signal falling below a first predetermined value indicating said light beam is focused onto said imageable media;

maintaining said fixed position of said focusing lens after said light beam is in focus; rotating said drum slowly while monitoring said electrical signal provided by said light sensor, and stopping said rotation of said drum if said electrical signal exceeds a second predetermined value indicating said imageable media is not securely fastened to said surface.

2. The method of claim 1 further comprising the step of allowing said drum to reach, normal operating speed if said electrical signal fails to exceed said second predetermined value after said drum is rotated a distance corresponding to a predetermined length of said plate.

3. The method of claim 1 further comprising the steps of providing an alarm to an operator if said electrical signal exceeds said second predetermined value, and further, preventing said drum from being rotated until said imaging machine is reset.

4. The method of claim 1 wherein said drum further comprises a plurality of clamps operative to fasten two ends of said imageable media to said support surface.

5. The method of claim 1 wherein said beam of light is directed horizontally, and impinges upon a portion of said imageable media positioned above or below a spin axis of said drum.

6. The method of claim 5 wherein said light reflected from said imageable media is diffuse light.

7. A method of verifying a recordable substrate is securely fastened to a surface of an external drum printing machine, said method comprising the steps of:

providing a recordable substrate, wherein said recordable substrate is mounted onto a support surface of an external drum printing machine;

focusing a light beam onto said recordable substrate;

directing light reflected from said recordable substrate onto a light sensor, said light sensor operative for providing an electrical signal representative of a focus condition of said light beam impinging, on said recordable substrate;

establishing a reference signal indicating said light beam is focused onto said recordable substrate;

rotating said drum slowly while monitoring said electrical signal provided by said light sensor; and stopping said rotation of said drum if said electrical signal deviates from said reference signal indicating said recordable substrate is not securely fastened to said surface.

8. The method of claim 7 further comprising the step of allowing said drum to attain normal operating speed if said electrical signal fails to deviate from said reference signal after said drum is rotated a distance corresponding to a predetermined length of said recordable substrate.

9. The method of claim 7 further comprising the steps of providing an alarm to an operator if said electrical signal deviates from said reference signal, and further, preventing said drum from being rotated until said printing machine is reset.

10. A method of verifying a printing plate has a first end and a second end securely clamped to a surface of an external drum platesetter, said method comprising the steps of:

providing a printing plate, wherein said plate is assumed to have both a first end and a second end securely clamped onto a surface of a drum of an external drum platesetter using a first clamp and a second clamp respectively;

rotating said external drum to position said first clamp proximate to an incident light beam such that said incident light beam impinges onto a portion of said first end of said plate;

focusing said incident light beam onto said printing plate using an auto focus system by varying a position of a focusing lens relative to said plate;

directing light reflected from said plate onto a light sensor, said light sensor operative for providing an electrical signal representative of a focus condition of said light beam on said printing plate;

monitoring said electrical signal provided by said light sensor, and fixing a position of said focusing lens when said electrical signal falls below a first predetermined value indicating said light beam is focused onto said printing plate;

maintaining said fixed position of said focusing lens after said light beam is in focus; rotating said drum slowly along a longitudinal length of said printing plate while monitoring said electrical signal provided by said light sensor; and stopping said rotation of said drum if said electrical signal exceeds a second predetermined value indicating said printing plate is not securely clamped to said surface; and wherein said incident light beam impinges upon said printing plate either above or below a spin axis of said drum.

11. The method of claim 10 further comprising the step of allowing said drum to reach normal operating speed if said electrical signal fails to exceed said second predetermined value after said drum is rotated a distance corresponding to a predetermined length of said plate.

12. The method of claim 10 further comprising the steps of providing an alarm to an operator if said electrical signal exceeds said second predetermined value, and further, preventing said drum from being rotated until said imaging machine is reset.

13. The method of claim 10 wherein said light reflected from said imageable media is diffuse light.

* * * * *